United States Patent [19]
Avenel

[11] Patent Number: 5,539,053
[45] Date of Patent: Jul. 23, 1996

[54] HIGH IMPACT STRENGTH METHYL METHACRYLATE/POLYURETHANE CAST SHEET MATERIALS

[75] Inventor: Michel Avenel, Gisors, France

[73] Assignee: Atochem, Puteaux, France

[21] Appl. No.: 462,912

[22] Filed: Jun. 5, 1995

Related U.S. Application Data

[63] Continuation of Ser. No. 984,088, Dec. 1, 1992, abandoned, which is a continuation of Ser. No. 669,868, Mar. 15, 1991, abandoned.

[30] Foreign Application Priority Data

Mar. 15, 1990 [FR] France .................................. 90 03321

[51] Int. Cl.$^6$ ........................... C08L 33/12; C08L 75/04
[52] U.S. Cl. ....................... 525/123; 525/127; 525/455; 525/903
[58] Field of Search ....................... 525/123, 127, 525/455, 903

[56] References Cited

U.S. PATENT DOCUMENTS

| | | | |
|---|---|---|---|
| 3,700,752 | 10/1972 | Hutchinson | 525/454 |
| 3,833,404 | 9/1974 | Sperling et al. | 525/119 |
| 3,886,229 | 5/1975 | Hutchinson et al. | 525/28 |
| 4,062,826 | 12/1977 | Hutchinson et al. | 523/512 |
| 4,223,114 | 9/1980 | Süling et al. | 525/455 |
| 4,233,424 | 11/1980 | Süling et al. | 525/455 |
| 4,302,553 | 11/1981 | Frisch et al. | 525/127 |
| 4,312,972 | 1/1982 | Khanna | 528/63 |
| 4,396,377 | 8/1983 | Roemer et al. | 523/115 |
| 4,396,476 | 8/1983 | Roemer et al. | 523/115 |
| 4,594,397 | 6/1986 | Goel et al. | 528/66 |
| 4,616,064 | 10/1986 | Zukosky et al. | 525/101 |
| 4,698,373 | 10/1987 | Tateosian et al. | 523/115 |
| 4,950,696 | 8/1990 | Palazotto et al. | 528/51 |
| 4,996,261 | 2/1991 | Lebovits et al. | 525/123 |
| 5,102,924 | 4/1992 | Williams et al. | 522/29 |

FOREIGN PATENT DOCUMENTS

| | | |
|---|---|---|
| 0272975 | 6/1988 | European Pat. Off. . |
| 0325875 | 8/1989 | European Pat. Off. . |
| 8916974 | 12/1989 | France . |

OTHER PUBLICATIONS

"*Fatigue Behavior of Acrylic Interpenetrating Polymer Networks. II*", T. Hur et al., *Journal of Applied Polymer Science*, vol. 39 (1990), pp. 1933–1947.

"*Composites formed by interstitial polymerization of vinyl monomers in polyurethane elastomers: 1. Preparation and mechanical properties of methyl methacrylate based composites*", G. Allen et al., *Polymer*, 1973, vol. 14, Dec., pp. 597–603.

*Primary Examiner*—James J. Seidleck
*Assistant Examiner*—Rabon Sergent
*Attorney, Agent, or Firm*—Burns, Doane, Swecker & Mathis

[57] ABSTRACT

High impact strength cast sheet materials having an unnotched Charpy impact strength of at least 60 kJ/m$^2$ comprise an interpenetrating network of a major amount of a reticulated methyl methacrylate polymer and from 3% to 8% by weight of an elastomeric polyurethane.

14 Claims, 1 Drawing Sheet

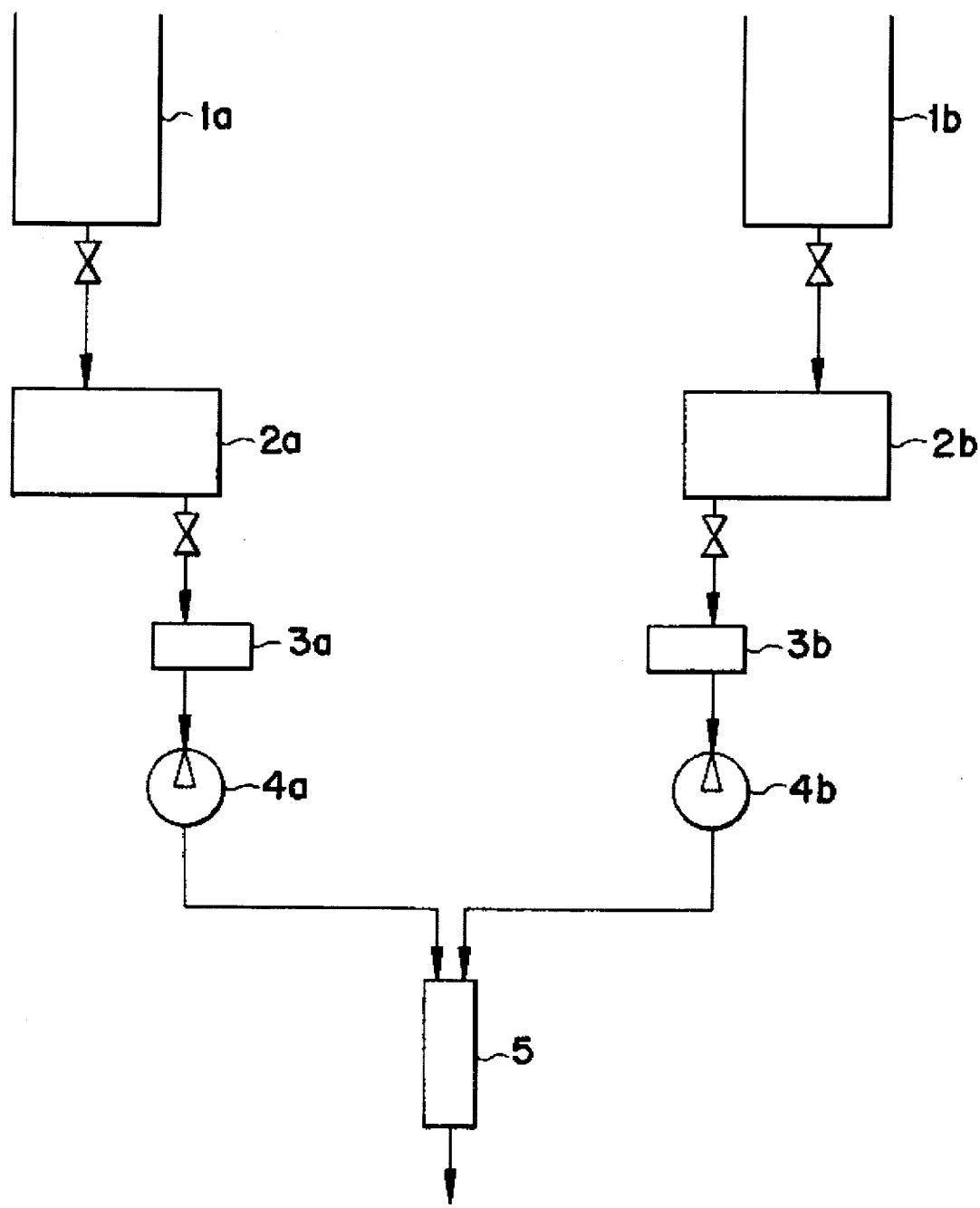

HIGH IMPACT STRENGTH METHYL METHACRYLATE/POLYURETHANE CAST SHEET MATERIALS

This application is a continuation of application Ser. No. 07/984,088, filed Dec. 1, 1992, now abandoned, which is a continuation of application Ser. No. 07/669,868, filed Mar. 15, 1991, now abandoned.

BACKGROUND OF THE INVENTION

1. Field of the Invention

The present invention relates to cast sheet materials based on a polyurethane and polymethyl methacrylate, comprising low concentrations of polyurethane, such sheet materials having a high impact strength as well as good optical properties. This invention also relates to a process for the production of such cast sheet materials.

2. Description of the Prior Art

The production of transparent cast sheets based on polymethyl methacrylate and a polyurethane is known to this art; see GB-A-1,239,701. The process described in said '701 patent entails, in a first stage, introducing into a mold a mixture comprising at least one vinyl monomer and precursors of crosslinked polyurethane which are devoid of any functional group copolymerizable with the vinyl monomer(s) (namely, at least one polyol and at least one organic compound containing at least two isocyanate functional groups) in such proportions that the ratio of the components of the polyurethane network to the sum of these components and of the vinyl monomer(s) ranges from to 5% to 95% by weight. In a second stage, the mold is subjected to temperature and pressure conditions permitting the successive formation of the polyurethane and then that of the polymethyl methacrylate in the presence of the said polyurethane.

EP-A-272,975 describes a process for manufacturing cast sheets having high impact strength, based on polymethyl methacrylate and polyurethane, and in which the ratio of the components of the polyurethane network to the sum of these components and of methyl methacrylate ranges from 5% to 35% by weight.

While the above prior art indicates that the cast sheets may contain a polyurethane content higher than 5% by weight, none exemplifies a sheet material having a low polyurethane content, i.e., less than 10% by weight.

The mechanical properties of cast sheets based on polymethacrylate and polyurethane which are described in the prior art vary as a function of the polyurethane content. In particular, when the polyurethane content increases, the impact strength increases. In contrast, the flexural modulus and the heat resistance (evaluated using the Vicat temperature) decrease.

Cast sheets having a low polyurethane content are of interest because of the fact that they are more stable to aging.

SUMMARY OF THE INVENTION

It has now unexpectedly been found vis-a-vis the state of the prior art that certain compositions based on polymethyl methacrylate and comprising low amounts of polyurethane exhibit impact strengths which are equivalent to or higher than those attained for identical compositions containing greater amounts of polyurethane. Consequently, such compositions surprisingly present the advantage of providing an excellent compromise between the impact strength, the Vicat temperature and the flexural modulus.

Briefly, the present invention features cast sheet material produced from a composition of polymethyl methacrylate and polyurethane in such proportions that the ratio of the components of the polyurethane network (namely, the sum of the organic compound(s) containing isocyanate functional groups and of the polyol(s)) to the sum of these components and of methyl methacrylate ranges from approximately 3% to 8% by weight; such sheet material has an impact strength (unnotched Charpy NFT 51035) greater than or equal to 60 kJ/m$^2$.

Within the above range of from approximately 3% to 8% by weight, each composition according to the invention has at least one singular point for which the impact strength, and especially the unnotched Charpy impact strength, attains a value which is clearly greater than that of compositions which have polyurethane contents less than 3% by weight or immediately greater than 8% by weight.

Also within the range of from approximately 3% to 8% by weight of polyurethane, the sheets cast therefrom exhibit high Vicat temperatures, which are greater than or equal to 100° C., and flexural moduli which are greater than or equal to 2000 MPa.

The precise composition corresponding to the aforesaid single point is a function of a number of criteria, among which will be mentioned, inter alia, the thickness of the cast sheet and the nature of the components, principally that of the polyol(s), and the presence or absence of acrylate monomers other than methyl methacrylate.

The present invention also features a process for the production of cast sheet materials having high impact strength, comprising:

(a) in a first stage, separately preparing, on the one hand, a solution (A) of methyl methacrylate which comprises an effective amount of at least one radical polymerization initiator, an effective amount of at least one organic compound containing at least two isocyanate functional groups, at least one polyol adopted to form an elastomeric polyurethane network with the isocyanate functional groups of the organic compound and, on the other hand, a solution (B) of methyl methacrylate which comprises an effective amount of at least one crosslinking agent for the methacrylate and a catalytically effective amount of at least one catalyst adopted for the formation of said polyurethane network;

(b) in a second stage, mixing said solutions (A) and (B);

(c) in a third stage, introducing the mixture thus prepared into a mold cavity;

(d) in a fourth stage, subjecting the mold containing the mixture of the solutions (A) and (B) to such conditions of pressure and temperature as to effect formation of the polyurethane network and then the polymerization of the methyl methacrylate within said network; and (e) in a final stage, permitting the polymerized mixture to cool in the mold and then demolding the cast sheet therefrom, with the proviso that the ratio of the components of the polyurethane network (i.e., the sum of the organic compound(s) containing isocyanate functional groups and of the polyol(s)) to the sum of such components and of the methyl methacrylate ranges from approximately 3% to 8% by weight, to product a sheet having an (unnotched Charpy) impact strength greater than or equal to 60 kJ/m$^2$.

BRIEF DESCRIPTION OF THE DRAWING

The FIGURE OF DRAWING is a schematic/diagrammatic illustration of one embodiment of the process/apparatus according to the invention.

DETAILED DESCRIPTION OF THE PREFERRED EMBODIMENTS OF THE INVENTION

More particularly according to the present invention, it should be appreciated that the formulations of the two solutions (A) and (B) referred to above are not fixed and that it is possible to transpose one or more constituents from one solution to the other, provided that all of the constituents required to form the polyurethane network are not present in the same solution, namely, the catalyst for curing said network, the polyol(s), and the organic compound(s) containing isocyanate functional groups.

The solution (A) formulated during the first stage of the process according to the invention comprises:

(i) methyl methacrylate;

(ii) a radical polymerization initiator especially selected from among the persulfates, peroxides, hydroperoxides and diazo compounds such as, for example, azobisisbutyronitrile, 1,1'-azobis(2-methylbutyronitrile), 2,2'-azobis(2,4-dimethylvaleronitrile), 1,1'-azobis-1-cyclohexanecarbonitrile, tert-butyl perbenzoate, tert-butylperoxy isopropyl carbonate and the like; when an alkali metal persulfate is selected as the initiator, it may be employed in combination with at least one reducing agent selected from among the polyhydrophenols, sodium sulfite and bisulfite, dimethylaminopropionitrile, diazomercaptans and ferricyanides. The initiator and, if appropriate, the reducing agent can be employed in a proportion of approximately 0.01% to 2% of each by weight relative to the total amount of methyl methacrylate present in solutions (A) and (B);

(iii) an organic compound containing at least two isocyanate functional groups. This compound may be difunctional, trifunctional, or even of higher functionality. It may be aliphatic, cycloaliphatic or aromatic or may even include groups of several of these categories. Exemplary such compounds include diisocyanates of the formula:

OCN—R—NCO, in which R is an alkylene radical having from 4 to 8 carbon atoms, and the oligomers thereof, as well as 4,4'-diphenylmethane diisocyanate, 2,4- and 2,6-toluene diisocyanates, isophorone diisocyanate, 4,4'-dicyclohexylmethane diisocyanate and trimerized hexamethylene diisocyanate;

(iv) a polyol reactive with the isocyanate functional groups of the organic compound present in solution (A) to form an elastomeric polyurethane network under certain conditions. Such a polyol may be selected from among the polyether glycols and polyester glycols and preferably has a molecular weight of at least 1,000 and a functionality greater than or equal to two.

The solution (A) may additionally include an effective amount of at least one flame-retardant such as, especially, tribromophenyl methacrylate, vinylidene chloride or organophosphorus compounds such as described in EP-A-117,174 and FR-A-2,567,127, and/or at least one pigment which is soluble in methyl methacrylate. It may also include at least one ethylenically unsaturated comonomer copolymerizable with methyl methacrylate, such as, for example, styrene, α-methylstyrene, tert-butylstyrene, n-butyl acrylate, 2-ethylhexyl acrylate, n-butyl methacrylate, vinlytoluene, and the like. It may also include an effective amount of at least one demolding or mold-release agent selected, for example, from among stearic acid, sodium dioctylsulfosuccinate and organic phosphoric esters. This demolding agent is typically employed in a proportion of approximately 0.01% to 2% by weight relative to the total amount of methyl methacrylate present in solutions (A) and (B). The presence of such a demolding agent is advantageous, particularly when the mold employed from the third stage and downstream in the process is an inorganic glass and/or when it is desired to produce transparent flat sheets which have a perfect quality of surface finish.

The solution (B) formulated during the first stage of the process according to the invention comprises:

(i) methyl methacrylate;

(ii) at least one crosslinking agent in a sufficient amount, more particularly in an amount of at least approximately 0.1% by weight and preferably not more than 5% by weigh relative to the total amount of methyl methacrylate present in solutions (A) and (B). Exemplary crosslinking agents include, for example:

(1) compounds containing at least two polymerizable double bonds, and (2) compounds containing at least one polymerizable double bond and at least one functional group reactive with methyl methacrylate and, where appropriate, comonomer thereof.

Exemplary of the aforesaid compounds which have at least two polymerizable double bonds are:

(a) di- or polyvinyl compounds such as, especially, divinylbenzene, divinyltoluene, divinylxylene, divinyl ether, divinyl ketone and trivinylbenzene;

(b) di- or polyesters of unsaturated mono- or polycarboxylic acids with polyols, such as esters of di- or tri(meth)acrylic acids with polyols (such as ethylene glycol, trimethylolpropane, glycerol, polyoxyethylene glycols, polyoxypropylene glycols, and the like), unsaturated polyesters (which can be prepared by reaction of any one of the abovementioned polyols with an unsaturated acid such as maleic acid), and the like;

(c) bis(meth)acrylamides such as N,N'-methylenebisacrylamide;

(d) carbamyl esters which can be prepared by reacting polyisocyanates (such as toluene diisocyanate, hexamethylene diisocyanate, 4,4'-diphenylmethane diisocyanate and the like and prepolymers containing an NCO group which are prepared by reacting such a diisocyanate with compounds containing active hydrogen atoms) with monomers containing hydroxyl groups. Such esters are, especially, those of di(meth)acrylic acids, which can be prepared by reacting the abovementioned diisocyanates with hydroxyethyl-(meth)acrylate;

(e) di- or poly(meth)allyl ethers of polyols such as alkylene glycols, glycerol, polyalkylene glycols, polyoxyalkylene polyols, carbohydrates, and the like, such as polyethylene glycol diallyl ether, allylated starch and allylated cellulose;

(f) di- or polyallyl esters of polycarboxylic acids, such as diallyl phthalate, diallyl adipate and the like; and (g) esters of unsaturated mono- or polycarboxylic acids with polyol mono(meth)allyl ethers, such as the ester of (meth)acrylic acid with polyethylene glycol monoallyl ether.

And exemplary of the aforesaid compounds which have at least one polymerizable double bond and at least one functional group reactive with methyl methacrylate and, where appropriate, comonomer thereof, are N-methylol-(meth)acrylamide, glycidyl(meth)acrylate, and the like;

(iii) a catalyst capable of promoting the formation of the polyurethane network when the polyol contacts the compound containing isocyanate functional groups. In order that the formation of the acrylic network should not be initiated prematurely, whatever the temperature conditions at the time of the contact, it is desirable that this catalyst should be selected such as not to form a redox pair with the initiator of polymerization of methyl methacrylate. This catalyst, in respect of which stannous octoate and dibutyltin dilaurate are exemplary, is preferably employed in a proportion of ranging from approximately 0.1% to 15% relative to the sum of the polyol and of the compound containing isocyanate functional groups.

The solution (B) may additionally include:

(1) at least one pigment which is dispersible in methyl methacrylate;

(2) an effective amount of at least one flame-retardant such as those described above;

(3) an effective amount of at least one chain limiter which may be selected, especially, from among diunsaturated monocyclic terpenes and monosaturated dicyclic terpenes, preferably in a proportion ranging from approximately 0.005% to 1% by weight relative to the total amount of methyl methacrylate present in solutions (A) and (B);

(4) an effective amount of at least one stabilizer against the action of ultraviolet radiation, selected preferably such as not to be reactive with the constituents and/or with the catalyst for reticulating the polyurethane network. This stabilizer will be preferably employed in a proportion ranging from approximately 0.03% to 2% relative to the methyl methacrylate;

(5) at least one organic peroxide that is a vulcanizing or curing agent for polyurethane, such as, for example, dicumyl peroxide, tert-butyl cumyl peroxide or tert-butyl peroxide, this being present in proportions preferably ranging from 0.002% to 0.5% by weight relative to the acrylic network.

It may also include at least one ethylenically unsaturated comonomer copolymerizable with methyl methacrylate, such as indicated above.

When one or more comonomer(s) of methyl methacrylate is (are) added to solution (A) and/or to solution (B), it is (they are) present in a total proportion which is preferably not more than 20% by weight relative to the total amount of methyl methacrylate present in solutions (A) and (B).

It may be desirable, especially in order to avoid air bubbles being trapped in the cast sheets (this being detrimental to their transparency), for either or both of solutions (A) and (B) to be degassed under partial vacuum, for example at a pressure of 25 to 250 millibars.

After having been prepared separately during the first stage, the two solutions (A) and (B) are mixed and this admixture is then introduced into a mold cavity, for example by means of the apparatus shown in the attached Figure of Drawing. This apparatus comprises mixers 1a and 1b in which the solutions (A) and (B) are respectively prepared, deaerators 2a and 2b in which the solutions thus prepared are degassed, filters 3a and 3b for separating off any solid particles which may be present in the degassed solutions, and metering pumps 4a and 4b by means of which the desired amounts of degassed and filtered solutions (A) and (B) are conveyed to the static mixer 5.

To promote the demolding of the cast sheet it may be desirable to provide a mold fabricated from an inorganic glass treated such as to preclude any reaction between the Si—O functional groups of the glass and the NCO functional groups of the isocyanate, for example an inorganic glass coated with an inorganic layer such as a layer of metal oxide hardened by pyrolysis.

To prevent the elastomeric polyurethane network from forming and/or the methacrylate polymerizing prematurely, it may be advantageous to employ a mold fabricated from a material which precludes photocatalysis of polymerization of either of the monomers present. The mold employed in the process according to the present invention must, furthermore, withstand the maximum temperature of the reaction mixture and must be unreactive or insoluble in contact with the liquid charge. Suitable such molds are fabricated from materials such as, for example, polyethylene, polypropylene, polyethylene terephthalate, silicone elastomers and such metals as, for example, aluminum, nickel or alloys such as brass or stainless steel. A metal mold will be more particularly suitable when the process according to the invention is carried out continuously, for example in a plant of the rolling mill type.

When all of the components of the system are placed in the mold, the latter is subjected to conditions, especially those of temperature and pressure, such that the polyurethane network is formed first by reaction between the —OH functional groups of the polyol and the —NCO functional groups of the isocyanate, and the methyl methacrylate then polymerizes within said network, thus forming what is conventionally designated an interpenetrating network. Indeed, the two macromolecular networks, that of polymethyl methacrylate and that of polyurethane, are interpenetrating physically and substantially without chemical bonding therebetween. Although it cannot be excluded that some intermacromolecular transfer reactions may take place, it can be stated that, by virtue of the process according to the invention, these undesirable reactions are so few in number that they do not adversely affect simultaneously providing excellent optical properties (in particular light transparency) and an excellent impact strength.

These conditions which may be employed are, for example:

(1) insofar as pressure is concerned, a pressure equal to atmospheric pressure, or else a pressure which may be as high as approximately 5 bars, or else a reduced pressure to as low as approximately 0.35 bars;

(2) insofar as the temperature is concerned, the latter may be within a range of from approximately 30° C. to 135° C., when the pressure is atmospheric pressure. The mold temperature may be increased progressively, for example in stages, within the range. More generally, it may be advantageous to provide a nonuniform temperature program in time, namely one comprising a number of stages of different time periods and operated at different temperatures. The length of the temperature cycle depends on the sheet thickness.

It should be appreciated that, aside from the preferred process of manufacture described immediately above, other processes for the manufacture of cast sheets according to the invention also exist, including, especially:

(i) partial formation of the polyurethane network in the uncatalyzed methyl methacrylate, this being effected thermally or otherwise, followed by the addition of the initiator required for the acrylic network to form, the reaction mixture being then subjected to degassing before being cast into a mold and then polymerized thermally, (ii) partial formation of the polyurethane network in a portion of the uncatalyzed methyl methacrylate, then the addition of the remainder of the methacrylate, the addition of the initiator required for the acrylic network to form, the reaction mixture being then subjected to degassing, and then cast into a mold before being polymerized thermally.

The process according to the present invention permits the manufacture of cast sheets which have a thickness ranging from approximately 1.5 to 25 mm. Such sheets are particularly advantageously used for the production of glazing which can be employed in different sectors of public safety. Secondarily, after bending or shaping, these sheets can also be used in the field of external orthopedic appliances.

In order to further illustrate the present invention and the advantages thereof, the following specific examples are given, it being understood that same are intended only as illustrate and in nowise limitative.

In said examples to follow, are parts and percentages are given by weight, unless otherwise indicated.

EXAMPLE 1

The following formulations were prepared at a temperature of 20° C. and with stirring, in the apparatus as shown in the attached Figure of Drawing:

(i) a solution (A) comprising 993 parts of methyl methacrylate, 1 part of stearic acid, 68.7 parts of polytetramethylene ether glycol marketed by du Pont de Nemours under the trademark Terathane 2000, 17.7 parts of trimerized hexamethylene diisocyanate marketed by Bayer under the trademark Desmodur N100, 0.82 parts of azobisisobutyronitrile, 0.41 parts of 2,2'-azobis(2,4-dimethylvaleronitrile) marketed by Wako under the trademark V65 and 0.41 parts of 1,1'-azobis(1-cyclohexane carbonitrile) marketed by Wako under the trademark V40, (ii) a solution (B) comprising 1007 parts of methyl methacrylate, 0.2 parts of terpinolene, 24 parts of bis(2,2,6,6-tetramethyl-4-piperidyl)sebacate marketed by Ciba-Geigy under the trademark Tinuvin 770 DF, 41 parts of butanediol diacrylate and 10 parts of dibutyltin dilaurate.

These two solutions were degassed and were then mixed in equal weights before being cast into a mold defined by two sheets of glass 600×800×8 mm in size provided with a polyvinyl chloride seal 5.6 mm in thickness, this assembly being secured by means of clamps. This mold was immersed in a polymerization trough controlled at a temperature of 30° C. The temperature of this trough was first maintained at 30° C. for 30 minutes, then increased to 60° C. over 45 minutes and maintained at this value for 4 hours and 30 minutes. The mold was then transferred to an air oven where the temperature was increased to 115° C. over 1 hour and maintained at this value for 2 hours. The temperature was then returned to 50° C. and was maintained at this value for 30 minutes prior to initiation and then demolding. A cast sheet was thus obtained having a thickness of 4 mm, containing 4% by weight of polyurethane for the preparation referred to as (1a) defined above.

According to the process described above, a series of preparations referred to as (1b) to (1i) were carried out in parallel, the quantities of the various base constituents being modified such as to produce cast sheets whose polyurethane contents (reported in Table 1 below) varied from 5% to 22% by weight.

The properties measured were:

(a) the Vicat B temperature determined according to AFNORT standard T 51021, (b) the unnotched Charpy impact determined according to AFNORT standard T 51035, (c) flexural modulus determined according to ISO standard R 378, (Instron 1185).

The results obtained are reported in Table 1 below, tests (1f) and (1i) being comparative:

TABLE 1

| Preparation | Property | | |
|---|---|---|---|
| | Polyurethane content (%) | Vicat B (°C) | Unnotched Charpy impact (kJ/m$^2$) |
| 1a | 4 | 105 | 45 |
| 1b | 5 | 107 | 39 |
| 1c | 6 | 106 | 61 |
| 1d | 7 | 101 | 68 |
| 1e | 8 | 98 | 59 |
| 1f | 10 | 95 | 43 |
| 1g | 12 | 94 | 40 |
| 1h | 14 | 94 | 34 |
| 1i | 22 | 94 | 72 |

It will be seen that, for the sheet produced in this example, the singular point is situated at a polyurethane content of 7% by weight; at this value the impact strength was 68 kJ/m$^2$. From this Table, it will also be seen that, at a value of only 7% by weight of polyurethane, the impact strength was higher than that obtained for higher polyurethane contents, which is contrary to what would be expected.

The flexural modulus determined for the sheet containing 7% polyurethane was 2,300 MPa and the light transmission was 90%. For a sheet obtained, for example, from the control preparation (1i), comprising a polyurethane content of 22% by weight, the flexural modulus was 1,300 MPa.

EXAMPLE 2

The procedure of Example 1 was repeated, except that the various proportions of the base constituents of the compositions were varied, with the degassing and the mixing of the solution A and B remaining similar otherwise. In contrast, the solutions referred to as (2a) to (2e) obtained in this event were cast into molds defined by two sheets of glass with a seal having a thickness of 8 mm, thus making it possible to produce 6-mm thick cast sheets. After being filled, the molds were immersed in a polymerization trough controlled at a temperature of 30° C., the temperature being first maintained at this value for 30 minutes and then increased to 55° C. over 45 minutes and maintained at this value for 8 hours. The mold assembly was then transferred to an air oven where the temperature was increased to 115° C. over 1 hour and then maintained at this value for 2 hours. The temperature was then returned to 50° C. and was maintained at this value for 30 minutes before finally initiating and then demolding, thus yielding cast sheets whose polyurethane contents varied from 4% to 22% by weight (see Table 2 below); the properties measured according to the methods set forth in Example 1 provided the results reported in Table 2 below:

TABLE 2

| Preparation | Polyurethane content (%) | Vicat B (°C) | Unnotched Charpy impact (kJ/m²) |
|---|---|---|---|
| 2a | 4 | 105 | 52 |
| 2b | 5 | 100 | 80 |
| 2c | 6 | 101 | 45 |
| 2d | 10 | 95 | 32 |
| 2e | 22 | 95 | 50 |

In this Example 2, the singular point was situated at a polyurethane content of 5% by weight. The flexural modulus was 2,200 MPa.

EXAMPLE 3

The following formulations were prepared, with stirring at a temperature of 20° C., in the apparatus as shown in the attached Figure of Drawing:

(i) a solution (A) comprising 990 parts of methyl methacrylate, 1 part of stearic acid, 55.5 parts of a mixture of polyoxypropylene/polyoxyethylene triol marketed by Arco under the trademark Arcol 4042, 18.7 parts of Terathane 2000, 12 parts of Desmodur N100, 0.41 parts of V65, 0.41 parts of V40 and 0.82 parts of azobisisobutyronitrile;

(ii) a solution (B) comprising 1000 parts of methyl methacrylate, 0.2 parts of terpinolene, 24 parts of Tinuvin-770 DF, 41 parts of butanediol diacrylate and 10 parts of dibutyltin dilaurate.

These two solutions were degassed and were then mixed in equal weights before being cast into a mold of the same type as that described in Example 1. Two other preparations referred to as (3b) and (3c) were formulated in parallel, the proportions of the various base constituents being modified such as to product cast sheets whose polyurethane contents (reported in Table 3 below) were 7% to 10% by weight, respectively.

After having been subjected to operating conditions which were identical to those described in Example 1, all these preparations produced 4-mm thick cast sheets for which the results corresponding to the measurements of physical properties according to the methods defined in Example 1 are reported in Table 3 below:

TABLE 3

| Preparation | Polyurethane content (%) | Vicat B (°C) | Unnotched Charpy impact (kJ/m²) |
|---|---|---|---|
| 3a | 4 | 103 | 22 |
| 3b | 7 | 102 | 69 |
| 3c | 10 | 97 | 25 |

In Example 3, the singular point was situated at a polyurethane content of 7% by weight. The flexural modulus was 2,300 MPa.

EXAMPLES (4A) AND (4B)

Example (4a)

The following formulations were prepared at a temperature of 20° C. and with stirring, in the apparatus as shown in the attached Figure of Drawing:

(i) a solution (A) comprising 710 parts by weight of methyl methacrylate, 90 parts by weight of polytetramethylene ether glycol marketed by du Pont de Nemours under the trademark Tetraphene 2000, 23.3 parts of trimerized hexamethylene diisocyanate, 0.3 parts of 2,2'-azobis(2,4-dimethylvaleronitrile), 0.6 parts of 2,2'-azobisisobutyronitrile and 0.3 parts of 1,1'-azobis(cyclohexane-1-carbonitrile); and (ii) a solution (B) comprising 795 parts by weight of methyl methacrylate, 0.2 parts of dibutyltin dilaurate catalyst and 25 parts of ethylene glycol dimethacrylate.

These two solutions were degassed and then mixed in equal weights before being cast into a mold defined by two sheets of glass, as described in Example 1, the seal having a thickness of 5 mm. After being filled, the molds were immersed in a polymerization trough controlled at a temperature of 61° C. This temperature was maintained for 4 hours. The mold was then transferred to an air oven in which the temperature was increased to 115° C. for 90 min. The temperature was then returned to 50° C. and was there maintained for 60 min before demolding. A 3.4-mm thick sheet was thus obtained, containing 7% by weight of polyurethane.

The impact strength (unnotched Charpy) was 60 kJ/m², the flexural modulus was 2070 MPa and the Vicat temperature 105° C. The light transmission was 89%.

It will be seen that, in this example, the sheet obtained had a flexural modulus lower than that of a sheet such as that produced in Example 3, at the same polyurethane content (7%). This was due to the fact that in Example (4a) a smaller amount of catalyst was employed. The use of a smaller amount of catalyst was of interest because the aging of the resulting sheet was accelerated When the catalyst content increased.

Example (4b):

By way of comparison, a cast sheet like that of Example (4a) was prepared, but the amounts of the various base constituents were modified such as to provide a sheet which had a polyurethane content of 18% by weight.

The impact strength was 60 kJ/m², the flexural modulus was 1,500 MPa, the Vicat temperature was 94° C. and the light transmission was 92%.

As will be seen, the sheet according to the invention based on polymethyl methacrylate and polyurethane, containing a low polyurethane content (7%) not only had a Vicat temperature and a flexural modulus which were higher, but also, quite surprisingly, an impact strength which was as high as the sheet having a polyurethane content of 18% by weight.

While the invention has been described in the terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A high impact strength cast sheet material, comprising an interpenetrating network of a major amount of a reticulated methyl methacrylate polymer and an elastomeric polyurethane in an amount selected within a range of 3 to 8% by weight to provide a Charpy impact strength of at least 60 kJ/m².

2. The cast sheet material as defined by claim 1, having a Vicat temperature of at least 100° C.

3. The cast sheet material as defined by claim 2, having a flexural modulus of at least 2,000 MPa.

4. The cast sheet material as defined by claim 3, having a thickness ranging from approximately 1.5 to 25 mm.

5. The cast sheet material as defined by claim 1, being optically transparent.

6. The cast sheet material as defined by claim 1, comprising polymethyl methacrylate.

7. The cast sheet material as defined by claim 1, comprising a copolymer of methyl methacrylate.

8. A shaped article comprising the cast sheet material as defined by claim 1.

9. A process for the production of the cast sheet material as defined by claim 1, comprising (a) admixing a solution (A) which comprises methyl methacrylate monomer, an effective amount of at least one radical polymerization initiator and such amount of elastomeric polyurethane-forming monomers as to provide from 3% to 8% by weight thereof in the final sheet product, with a solution (B) which comprises methyl methacrylate monomer, an effective crosslinking amount of at least one crosslinking agent therefor and an effective polymerizing amount of at least one catalyst for the preparation of said elastomeric polyurethane, (b) progressively polymerizing such admixture in a mold cavity under such conditions as to successively form said elastomeric polyurethane and then to polymerize said methyl methacrylate therein, and then (c) cooling said polymerized admixture and demolding said sheet material from the mold cavity.

10. The process as defined by claim 9, said step (b) being carried out at a temperature ranging from 30° C. to 135° C. at about atmospheric pressure.

11. A high impact strength cast sheet material, comprising an interpenetrating network of a major amount of a reticulated methyl methacrylate polymer and an elastomeric polyurethane in an amount selected within a range of 3 to 8% by weight to provide a Charpy impact strength of at least 60 $kJ/m^2$ prepared by (a) admixing a solution (A) which comprises methyl methacrylate monomer, an effective amount of at least one radical polymerization initiator and such amount of elastomeric polyurethane-forming monomers as to provide from 3% to 8% by weight thereof in the final sheet product, with a solution (B) which comprises methyl methacrylate monomer, an effective crosslinking amount of at least one crosslinking agent therefor and an effective polymerizing amount of at least one catalyst for the preparation of said elastomeric polyurethane, (b) progressively polymerizing such admixture in a mold cavity under such conditions as to successively form said elastomeric polyurethane and then to polymerize said methyl methacrylate therein, and then (c) cooling said polymerized admixture and demolding said sheet material from the mold cavity.

12. A high impact strength cast sheet material comprising an interpenetrating network of a major amount of a reticulated methyl methacrylate polymer and an elastomeric polyurethane in an amount selected within a range of 3 to 8% by weight to provide a Charpy impact strength of a value greater than an identical composition containing 10% by weight elastomeric polyurethane said material having been prepared such that polyurethane network is formed first by reaction between —OH functional groups of a polyol and —NCO functional groups of an isocyanate, and the methyl methacrylate then polymerizes within the polyurethane network thus forming a physically interpenetrating network without substantial chemical bonding between the polyurethane network and the methyl methacrylate.

13. The cast material according to claim 12, wherein said material is prepared at a pressure between 0.35 bars and 5 bars.

14. The cast material according to claim 12, wherein said material is prepared at a temperature between 30° C. and 135° C.

* * * * *